US007325861B2

(12) United States Patent
Zacheiss et al.

(10) Patent No.: US 7,325,861 B2
(45) Date of Patent: Feb. 5, 2008

(54) STRUCTURAL COMPONENT OF A MOTOR VEHICLE BUMPER ARRANGEMENT

(75) Inventors: Sven Zacheiss, Kleinheubach (DE); Peter Raim, Rodgau (DE); Peter Diehl, Kirchheim (DE)

(73) Assignee: Decoma (Germany) GmbH, Sulzbach (DE)

( * ) Notice: Subject to any disclaimer, the term of this patent is extended or adjusted under 35 U.S.C. 154(b) by 41 days.

(21) Appl. No.: 10/582,252

(22) PCT Filed: Dec. 9, 2004

(86) PCT No.: PCT/IB2004/004054

§ 371 (c)(1),
(2), (4) Date: Jun. 9, 2006

(87) PCT Pub. No.: WO2005/056344

PCT Pub. Date: Jun. 23, 2005

(65) Prior Publication Data

US 2007/0108779 A1 May 17, 2007

(30) Foreign Application Priority Data

Dec. 9, 2003 (DE) ................................ 103 58 473

(51) Int. Cl.
*B60K 7/00* (2006.01)
(52) U.S. Cl. ................ 296/187.09; 293/120; 180/68.4
(58) Field of Classification Search .......... 296/187.09, 296/208; 293/120, 121, 122, 123; 180/68.1
See application file for complete search history.

(56) References Cited

U.S. PATENT DOCUMENTS

| | | | |
|---|---|---|---|
| 4,753,468 A * | 6/1988 | Szymczak et al. ......... 180/68.6 |
| 5,452,931 A * | 9/1995 | Chase ........................ 180/68.6 |
| 5,658,041 A * | 8/1997 | Girardot et al. ........ 296/193.09 |
| 6,022,057 A * | 2/2000 | Vermeulen ................... 293/132 |
| 6,386,624 B1 * | 5/2002 | Schultz et al. ........... 296/193.1 |
| 6,508,506 B2 * | 1/2003 | Ozawa et al. .......... 296/203.02 |
| 6,527,317 B2 * | 3/2003 | Fox et al. .................... 293/115 |
| 6,676,179 B2 * | 1/2004 | Sato et al. ................... 293/121 |
| 6,880,655 B2 * | 4/2005 | Suwa et al. ................ 180/68.1 |
| 6,945,593 B2 * | 9/2005 | Andre et al. ........... 296/187.09 |
| 7,044,517 B2 * | 5/2006 | Hyuga ..................... 296/193.1 |
| 7,090,265 B2 * | 8/2006 | Otte ........................... 293/115 |

(Continued)

FOREIGN PATENT DOCUMENTS

AT      385 245 B      3/1988

(Continued)

OTHER PUBLICATIONS

International Search Report & Written Opinion for PCT/IB2004/004054 Dated Jun. 28, 2005.

(Continued)

*Primary Examiner*—Kiran B. Patel
(74) *Attorney, Agent, or Firm*—Clark Hill PLC

(57) ABSTRACT

A structural component for mounting in a lower region of a motor vehicle bumper arrangement comprises a longitudinal dimension and is constructed in cross-section such that its spring characteristic in relation to bending stress in a direction (x) substantially at right angles to its longitudinal dimension corresponds substantially to the spring characteristic of a part of the bumper arrangement located above and adjacent to the structural component.

17 Claims, 6 Drawing Sheets

U.S. PATENT DOCUMENTS

| | | | |
|---|---|---|---|
| 7,152,916 B2 * | 12/2006 | Roussel | 296/203.02 |
| 2004/0124643 A1 * | 7/2004 | Matsumoto et al. | 293/115 |
| 2007/0158962 A1 * | 7/2007 | Woodhouse et al. | 293/120 |

FOREIGN PATENT DOCUMENTS

| | | |
|---|---|---|
| DE | 4307837 | 9/1993 |
| DE | 19912272 | 9/2000 |
| DE | 19921480 | 11/2000 |
| DE | 10112424 A1 | 9/2002 |
| EP | 1046546 A1 | 10/2000 |
| EP | 1138557 | 10/2001 |
| EP | 1241080 A2 | 9/2002 |
| JP | 58 152674 A | 9/1983 |
| WO | WO02/074570 A1 | 9/2002 |

OTHER PUBLICATIONS

English Abstract of DE 19921480.
English Abstract of DE 4307837.
English Abstract of DE 19912272.
English Abstract of DE 10112424.
English Abstract of JP 58 152674 A, Sep. 10, 1983.

* cited by examiner

STRUCTURAL COMPONENT OF A MOTOR VEHICLE BUMPER ARRANGEMENT

CROSS-REFERENCE TO RELATED APPLICATIONS

This application is a U.S. national stage application of PCT Application No. PCT/IB2004/004054, filed Dec. 4, 2004, which claims priority to German Application No. 10358473.0, filed Dec. 9, 2003.

BACKGROUND OF THE INVENTION

1. Field of the Invention

The invention relates to a structural component for mounting in a lower region of a motor vehicle bumper arrangement or bumper assembly.

2. Description of the Related Art

Bumper arrangements or bumper assemblies on modern motor vehicles are generally complex assemblies as the bumper arrangements have to meet a variety of requirements simultaneously, e.g., in terms of a favorable coefficient of air resistance, optical individualization of the vehicle or effective impact protection for pedestrians in order to meet current accident prevention requirements.

Document DE 199 21 480 A1 describes a front spoiler for a motor vehicle. The front spoiler can be extended in the longitudinal direction of the vehicle in order to be able to adapt the so-called overhang angle β to a desired value, with the aim of combining good all-terrain performance by the vehicle with an effective impact protection for pedestrians.

Document DE 43 07 837 A1 discloses a transverse carrier arrangement for a front bumper of a motor vehicle which is intended to absorb the impact forces caused by an accident. The transverse carrier arrangement comprises two carrier profiles extending parallel to one another which are designed in their dimensions and arrangement with one another such that, on the application of force, one of the two carrier profiles is subjected to so-called inverted deformation. The deformation energy acting in this case helps to absorb the impact forces of an accident.

Document DE 199 12 272 shows a bumper arrangement which comprises a transverse carrier and a transverse bar provided underneath the transverse carrier. The transverse carrier is attached to longitudinal carriers on the vehicle body via spacer brackets, the transverse carrier and/or the spacer brackets being subdivided, at least in parts, into at least two deformation areas with different force levels, located one behind the other in the longitudinal direction of the vehicle. However, a disadvantage of this bumper arrangement is that rigidity in a direction at right angles to the transverse carrier or transverse bar is higher in an area adjacent to the transverse bar, i.e. in a lower region of the bumper arrangement, and thus involves a greater risk of fracture to the lower leg of a pedestrian.

Document EP 1 046 546 A1 discloses a bumper on a motor vehicle, wherein the mechanical properties of the bumper are adapted to effective impact protection for pedestrians. Specifically, the bumper has greater rigidity in its lower region than in its upper region. Thus, the impact force in the event of a collision with a pedestrian is concentrated on the lower region of the bumper. A disadvantage of this is that an undesirably high local concentration of force may be produced in the pedestrian's leg area, once again involving an undue danger of fracture.

A number of conventional bumper systems have the disadvantage that they do not meet, or only partly meet, the complete list of points of the current European regulations on pedestrian safety, i.e. the so-called EURO NCAP. In particular, some known bumper systems are so rigid in the event of frontal impact with a pedestrian, as a result of solid transverse carrier elements or the like, that the breakage force in the region of the lower leg is exceeded.

SUMMARY OF THE INVENTION

Accordingly, the object of the invention is to provide a structural component for mounting in a lower region of a motor vehicle bumper arrangement, by means of which the risk of fracture to the lower leg on hitting a pedestrian is minimized as much as possible and with which the disadvantages attached to the prior art as described above are overcome.

With the structural component according to the invention, in the event of frontal impact with a pedestrian, the bending angle of the pedestrian's lower leg on impact is restricted to the bumper as the lower leg is kept substantially parallel on making contact with the front covering. Thus, according to the invention, the rotation of the lower leg is limited, thus enabling uniform characteristics over the entire height of the impact zone in accordance with the pedestrian safety guidelines in force, i.e. the current EU regulations EURO NCAP. As the structural component according to the invention, which is intended for mounting in a lower region of a bumper arrangement, has a spring characteristic in relation to bending stress which is substantially perpendicular to its longitudinal extent, and which is matched to the spring characteristic of an adjacent part of the bumper arrangement located above it, a harder response is achieved, compared with conventional arrangements, for the bumper arrangement in the event of bending deformation in the direction of travel, i.e at right angles to the longitudinal extent of the bumper arrangement. At this, the bumper arrangement is deformed uniformly, viewed over its height. This so-called harder response of the structural component according to the invention, or of a bumper arrangement provided therewith, reduces the bending angle, as already explained, in relation to the lower leg of the affected pedestrian.

This property of the structural component according to the invention in relation to its spring characteristic can expediently be achieved by means of at least one reinforcing element which is constructed in a direction substantially perpendicular to the longitudinal direction of the structural component. The reinforcing element thus extends backwards, viewed in the direction of travel, thereby improving the spring characteristic in the lower region of the bumper arrangement. By a suitable choice of dimensions for the reinforcing element, such as e.g. the length in a direction at right angles to the longitudinal extent, wall thickness, or the like, the spring characteristic of the structural component can be adjusted as desired, in relation to bending in a direction substantially perpendicular to the longitudinal extent of the structural component. Additionally, the spring characteristic may, for example, also be adapted to the requirements of the bumper arrangement by means of a plurality of reinforcing elements.

According to an advantageous feature of the invention the structural component may have at least one air inlet facing the direction of travel of the vehicle, forming a passage towards an engine compartment. Thus, the structural component additionally acts to provide an air inlet or an air passage in the direction of the engine compartment, improving the cooling of the engine and possibly helping to prevent heat shock of the engine.

In its function as an insert in the bumper arrangement the structural component simultaneously acts as an air inlet grille, so that it is not readily apparent from the front view of the bumper arrangement that it meets such high requirements in terms of passive safety, as explained above. In other words, the structural component according to the invention does not alter the visual appearance of the bumper arrangement, which is greatly dominated by air inlets and the like in modern cars.

According to a further feature of the invention, the structural component has an overhang of substantially zero, relative to a region of the remainder of the bumper arrangement adjacent to the upper edge of the structural component. This advantageously ensures that in the event of frontal impact with a pedestrian the pedestrian's leg area is struck flat on and the bending angle is correspondingly small.

According to an advantageous further feature of the invention, the structural component may be integrally formed with an air inlet grille of the bumper arrangement, which adjoins its upper edge. Furthermore, a lower edge of the structural component may extend in the direction of the engine compartment in order to at least partly shield, from below, a cooling module carrier or the like arranged above it. In this way the cooling module carrier is protected, for example, from damage from the pavement or the like. In this or in a similar manner the structural component thus serves as a so-called multifunctional component which in conjunction with the bumper arrangements acts, inter alia, as a radiator grille, an air conducting component or as a reinforcement in the spoiler region.

According to an advantageous feature, a frame portion may be provided on each lateral end of the structural component according to the invention, to provide lateral reinforcement. For this purpose the frame portion may, for example, be at least box-shaped in structure extending substantially at right angles to the longitudinal direction of the structural component. The respective frame portions may either be provided as separate components and attached by interlocking engagement to the lateral ends of the structural component. Alternatively, the structural component may also be formed in one piece with the frame portions.

Non-torsional fixing of the frame portions is advantageously achieved by having the corresponding fixing points to the vehicle body located, in particular, at a laterally outer part of the body, i.e. as far outwards as possible. If frontal impact occurs in the region of the laterally mounted frame sections, the introduction of impact force through the frame portion into the body is advantageously improved by the fact that the frame portion in question has, adjacent to a body part, a substantially vertically extending support surface which abuts on a corresponding body part when the structural component is in its assembled position. This interlocking engagement supports the frame portion at the back against the body part and prevents undesirable sliding of the frame portion towards the engine component in the event of an impact.

The integration of functions in the structural component according to the invention or in the bumper arrangement, as described hereinbefore, reduces the number of parts, their weight and their costs. Specifically, the cost reduction is a result of the lower manufacturing costs of only one part and also the reduced assembly sizes. The design as a molding also gives a high degree of freedom in selecting the required hardness of the bumper cladding in the spoiler region.

According to an advantageous further feature of the invention, the structural component is made from a hard plastics material, manufacture by injection molding being particularly suitable. Alternatively, the component may be produced by thermoforming or injection-compression molding in the same way. Expediently, the plastics material used for the manufacture may consist of a polypropylene, which is particularly suitable on account of its good mechanical properties and its favorable raw material costs.

Advantageously, an outer covering or cladding is provided on the structural component in order to meet the conventional requirements for a desirable visual appearance. The outer covering may be attached to the structural component, for example, by interlocking engagement by an expanding rivet connection, a clip connection, push-in metal clip, nut, or the like. All these types of connections can be operated easily during assembly and ensure a very short assembly time together with a secure and accurate fixing of the covering to the structural component.

In a preferred embodiment, the structural component and/or the frame portion mounted thereon and the covering each have a support lug, and engage with one another by means of the support lugs. The respective support lugs are formed substantially in the longitudinal direction of the structural component. In the event of frontal impact and accordingly an impact force acting from the outside on to the outer covering counter to the direction of travel, the respective support lugs which engage with one another prevent the covering and the structural component or frame portion from sliding relative to one another. This results in a defined introduction of the impact force into the vehicle body in the direction of the longitudinal axis of the vehicle.

An improved absorption of force in the event of frontal impact is provided by an impact absorber by which the bumper arrangement with the structural component according to the invention is mounted on a transverse carrier of a vehicle body, the impact absorber having a cavity in the vertical direction. The cavity is arranged on a side surface of the impact absorber adjacent to the transverse carrier. As a result of a suitably controlled deformation of the impact absorber in the event of frontal impact, the lower limb of a pedestrian passes over the structure in a softer movement, thus further reducing the risk of fracture.

Further features and embodiments of the invention will become apparent from the description and the accompanying drawings.

It will be understood that the features recited above and those to be described hereinafter may be used not only in the particular combinations specified but also in other combinations or on their own without departing from the scope of the present invention.

BRIEF DESCRIPTION OF THE DRAWINGS

The invention is schematically shown by an exemplifying embodiment in the drawings and is described in detail hereinafter with reference to the drawings, wherein.

DETAILED DESCRIPTION OF THE PREFERRED EMBODIMENTS

Figure 1:
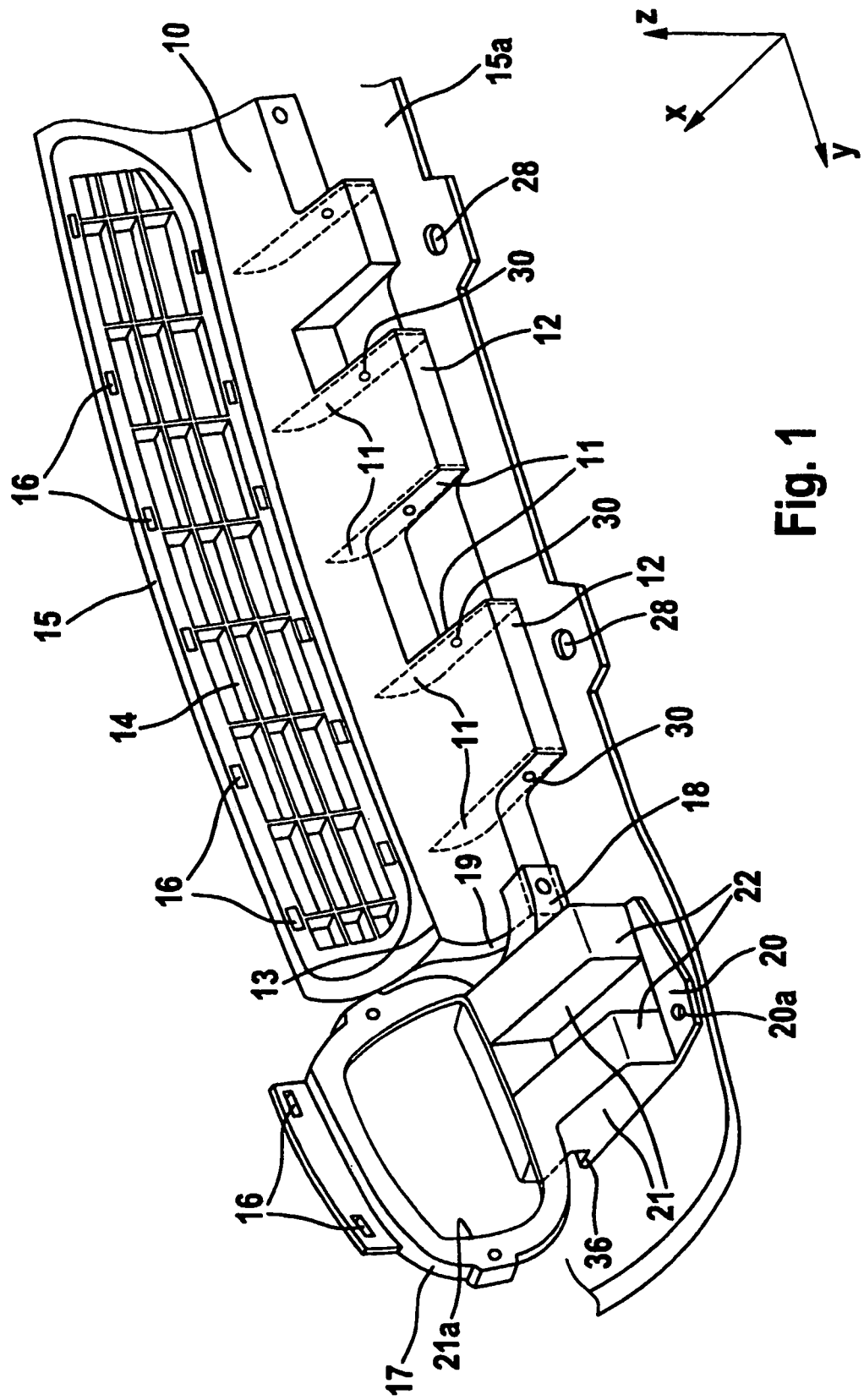
FIG. 1 is a perspective view of a structural component according to the invention, in a lateral detail.

FIG. 1 shows an embodiment of a structural component 10 according to the invention viewed in perspective from behind, i.e. viewed as from an engine compartment. Because of the symmetrical nature of the structural component, only a left hand region thereof is shown in FIG. 1. The structural component 10 has a longitudinal dimension in the direction y. Over the width of the structural component, i.e. along the longitudinal dimension in the direction y, a plurality of reinforcing elements 11 are provided in the form of reinforcing ribs which extend substantially at right angles to the longitudinal dimension of the structural component 10, i.e. in the direction x.

Figure 6:
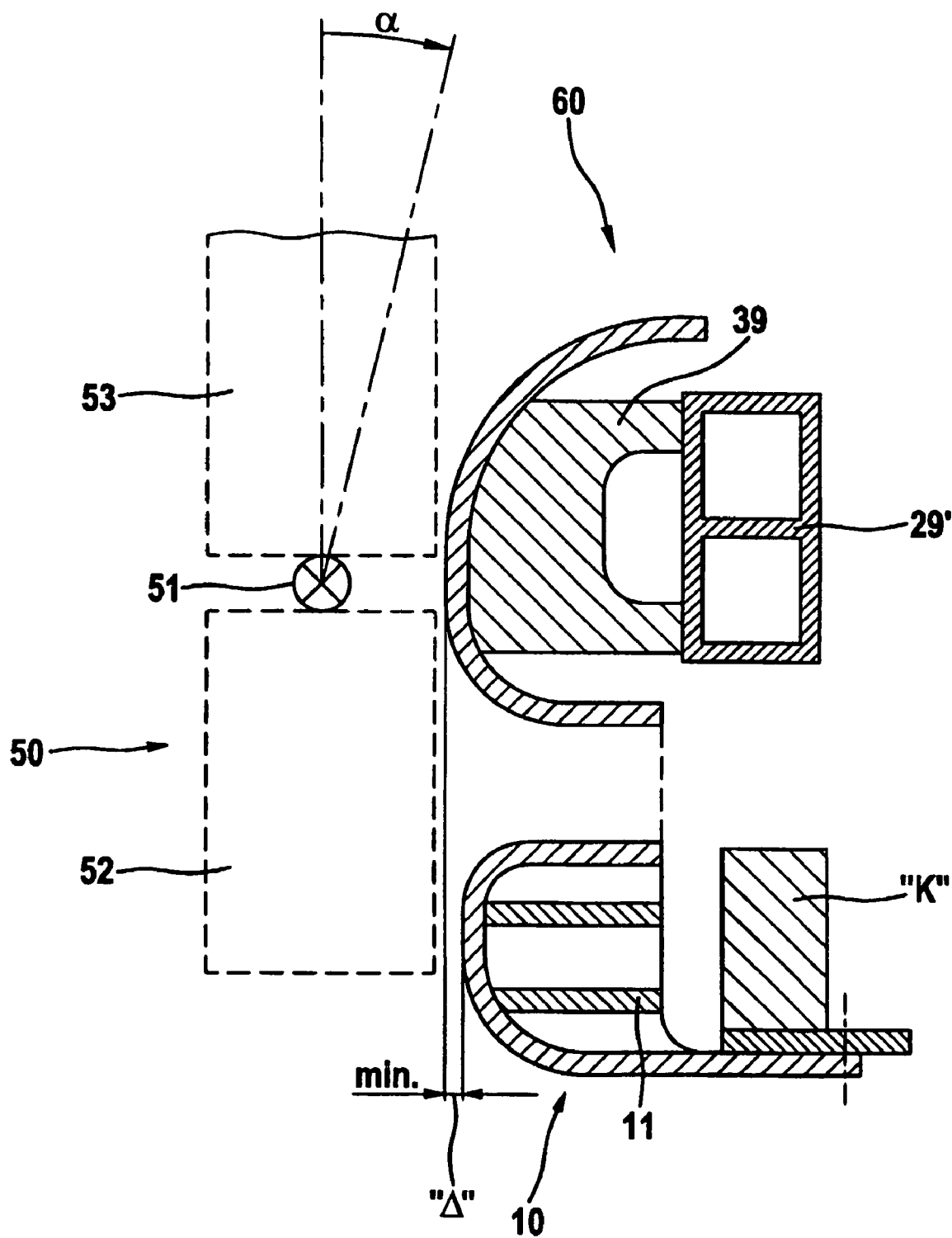
FIG. 6 is a highly simplified lateral cross-sectional view of a bumper arrangement with a structural component mounted therein, interacting with a pedestrian's leg.

The respective reinforcing ribs 11 are shown by broken lines in FIG. 1. The alignment of the respective reinforcing ribs 11 in direction x, corresponding to the direction of travel of a motor vehicle, and a suitably selected thickness for the reinforcing ribs 11 and their length in the direction x influence a spring characteristic of the structural component 10, in the desired manner, in relation to a bending stress in direction x, i.e. in a direction substantially perpendicular to the longitudinal dimension of the structural component. In other words, the configuration of the reinforcing ribs 11, in addition to the general properties of a material used to produce the structural component 10, has a major influence on the rigidity of the structural component in the direction x, i.e. on the corresponding spring characteristic in relation to a bending stress in a direction substantially perpendicular to the longitudinal dimension of the structural component 10. The above-mentioned spring characteristic of the structural component 10 in this direction is suitably selected so as to be matched to a spring characteristic of an adjacent part (not shown in FIG. 1) of the bumper arrangement above the structural component 10. This is further explained hereinafter with reference to FIG. 6.

The structural component 10 has, on its side facing the direction of travel, a plurality of air inlets 12 which form an air passage to an engine compartment located behind the structural component 10. On the one hand this confers the advantage of a greater supply of air into the engine compartment and also gives the vehicle the desired appearance in front view. Very recently there has been an increasing trend in motor cars to have a front appearance dominated by air inlets and the like.

Arranged on an upper edge 13 of the structural component 10 is an air inlet grille 14 which extends in the direction y. For economy of manufacture it is advantageous if the air inlet grille 14 is formed in one piece with the structural component 10, which may be achieved particularly by injection molding of a plastic such as polypropylene or the like, for example. Alternatively, other methods of production for a plastic are possible, such as thermoforming, injection-compression molding, or the like. The air inlet grille 14 also has at its top edge 15 a plurality of recesses 16 by which the air inlet grille 14 and with it the structural component 10 can suitably be connected to a part of the bumper arrangement which is adjacent to and above it (not shown in FIG. 1), e.g. by means of snap-in connections, screw connections, or the like.

At each lateral end of the structural component 10 is provided a frame portion 17 which ensures lateral stiffening of the bumper arrangement. In the embodiment shown here the frame portion 17 is connected by a flange portion 18 laterally formed thereon which interlockingly engages with a side area 19 of the structural component 10. The frame portion 17 has on its rear side a protruding bar 20 in which a through-hole 20a is formed. The frame portion 17 can easily be connected to a part of the vehicle body in suitable manner by means of a screw connection which passes through the through-hole 20a. The frame portion 17 also has on its upper side a plurality of recesses 16 by means of which it can be connected or attached to an adjacent part of the bumper arrangement located above it, in the same way as with the air inlet grille 14.

In direction x, the frame portion 17 has two box-shaped extensions 21 which confer relatively great rigidity on the frame portion 17, particularly under bending stress in direction x. On a back side the respective extensions 21 each have a support surface 22 which extends substantially in the vertical direction, i.e. in direction z. If the structural component 10 together with the frame portion 17 is mounted on the vehicle body the support surface 22 is in contact abutment with a correspondingly formed contact surface 23 (see FIG. 4) of the vehicle body. This provides the desired frictional connection of the frame portion 17 in the direction of the contact surface 23 of the vehicle body in direction x.

The frame portion 17 also has a central recess 21a which serves to accommodate fog lamps, additional head lamps, or the like. The frame portion 17, as well as the air inlet grille 14, may also comprise additional holders or the like for accommodating other vehicle accessories such as temperature sensors or the like. Thus the structural component 10 and air inlet grille 14 and also the frame portion 17 act as so-called multifunctional parts.

An outer covering 24 is provided on an outside of the structural component 10. The attachment of the covering 24 to the structural component 10 and to the vehicle body is described in detail hereinafter.

Figure 2:
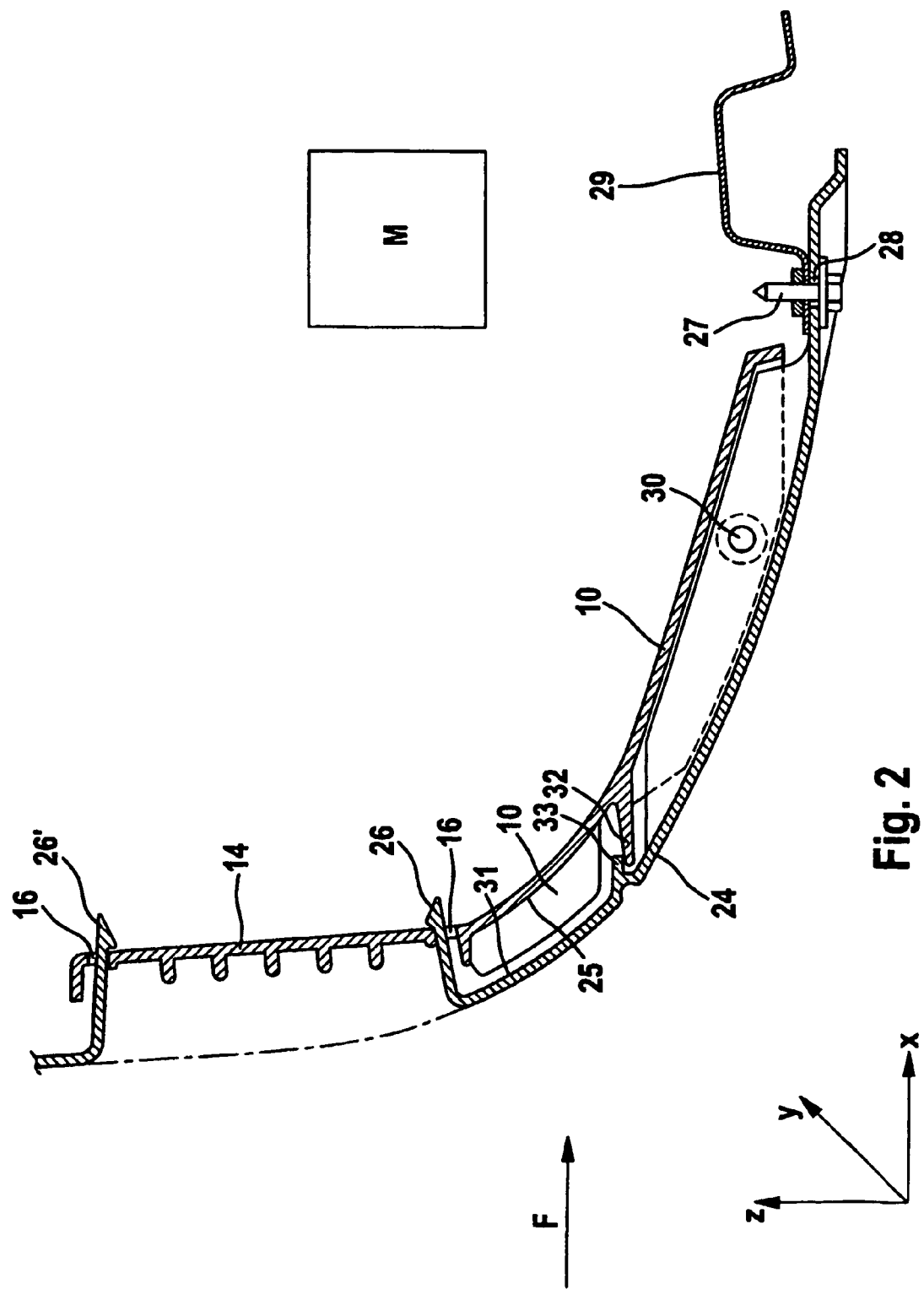
FIG. 2 is a detail of a central part of the structural component of FIG. 1 in a lateral cross-sectional view with an outer covering attached thereto.

FIG. 2 shows a lateral cross-section through a central region of the structural component 10 shown in FIG. 1. The covering 24 extends from a lower edge of the air inlet grille 14 over an outer surface 25 of the structural component 10 and further on in direction x into a region underneath the engine compartment which is symbolically represented by the letter M in FIG. 2. The covering 24 is attached to the lower edge of the air inlet grille 14 in recesses 16 formed therein by means of at least one snap-in connection 26. In the area specified underneath the engine compartment M the covering 24 is also secured to the vehicle body by means of a suitable screw connection 27. For this purpose the covering 24 has on its rear edge a plurality of through-holes 28 through which the respective screws are passed in order to engage in threaded sockets or the like provided accordingly in a body part 29. The covering 24 is additionally attached to a central region of the structural component 10 by means of a plurality of expanding rivets 30, so that the covering 24 is attached in a precisely fitting manner and hence reliably and free from flapping, over the longitudinal extent of the structural component, i.e. in direction y.

On the outer surface 25 of the structural component and also on an inner surface 31 of the covering 24, facing the structural component 10, are provided respective support lugs 32, 33, these lugs engaging with one another when the covering is fitted. The support lug 32 formed on the outer surface 25 of the structural component 10 is designed so as to engage under the support lug 33 formed on the inner surface 31 of the covering 24. This prevents relative movement of the covering 24 and structural component 10 relative to one another in the event of an external application of force as indicated by the arrow F in FIG. 2. In other words, when the external force is applied as described, the covering 24 does not slide downwards over the outer surface 25 in the direction z, with the result that the impact force is directed in controlled manner into the vehicle body via the structural component 10.

At the top of FIG. 2 the recesses 16 are shown which are formed at the upper edge 15 of the air inlet grille 14. The upper edge 15 of the air inlet grille 14 is suitably connected to a part (not shown) of the bumper arrangement which is adjacent and above it, by means of a suitable snap-in connection 26'.

Figure 3:
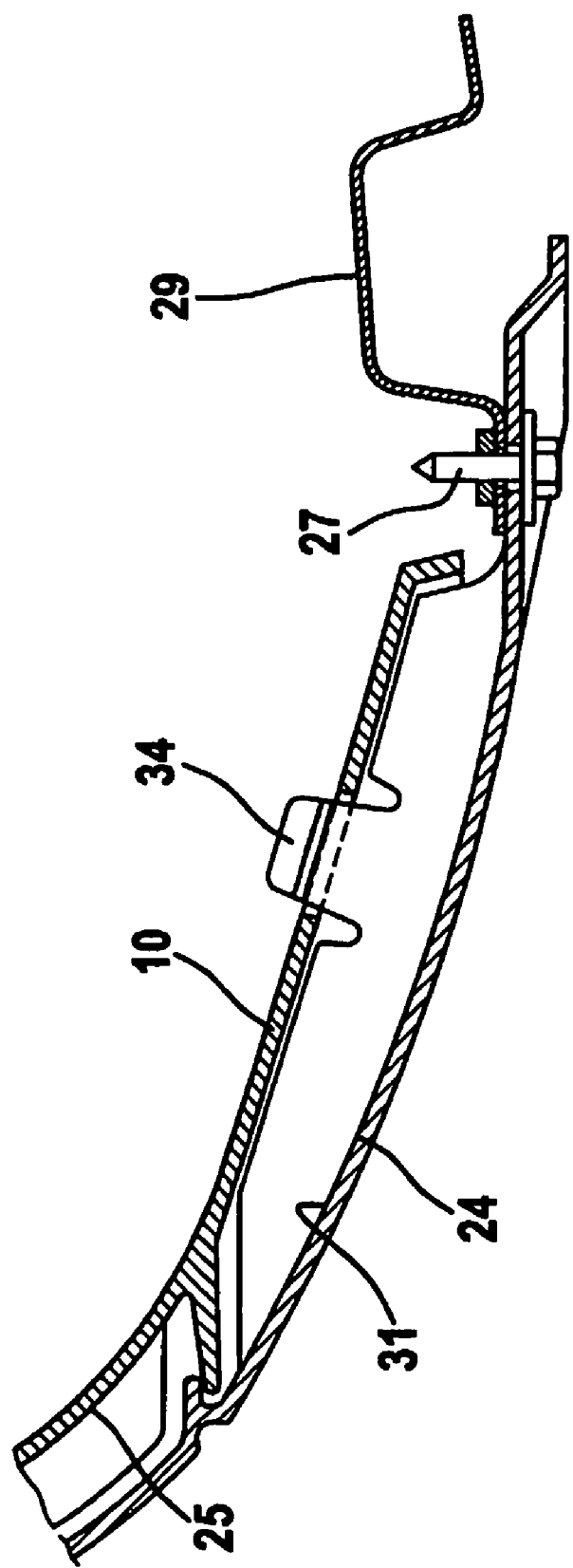
FIG. 3 is a lateral cross-sectional view of the structural component according to the invention analogously to FIG. 2.

FIG. 3 shows the central region of the structural component 10 in lateral cross-sectional view analogous to FIG. 2. By contrast with FIG. 2, the covering 24 is attached to the structural component 10 by a clip connection 34 which ensures reliable and accurate mounting of the covering 24 in the same way as the previously described connection using expanding rivets 30.

Figure 4:
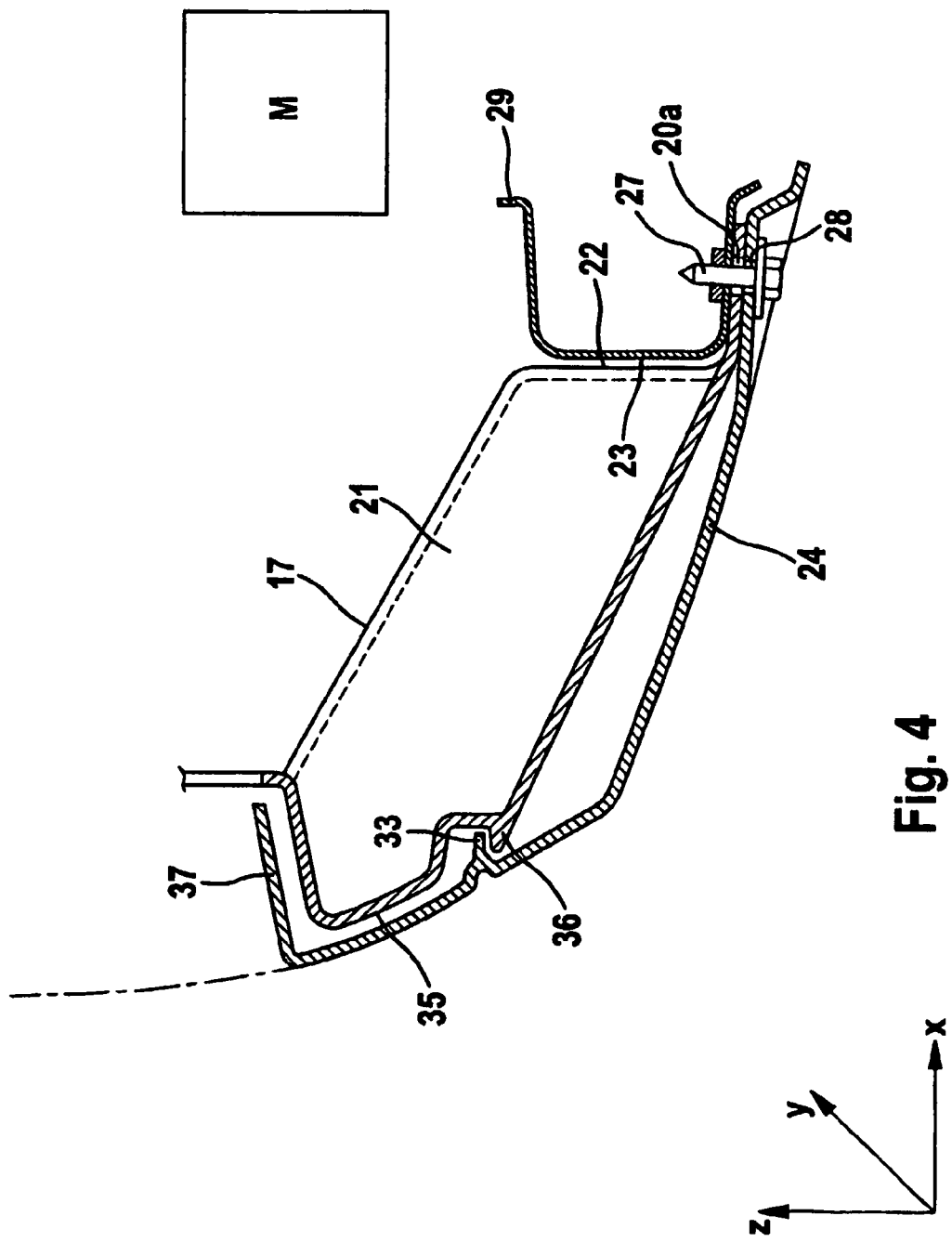
FIG. 4 is a detail of an outer part of the structural component according to the invention in a lateral cross-sectional view with a lateral frame portion mounted thereon.

FIG. 4 shows a lateral cross-sectional view of a side region of the structural component 10 in which the frame portion 17 is mounted on the structural component 10. A front edge of the frame portion 17 comprises, in the region of an end face 35 of the box-shaped extension 21, a support lug 36 which, in the same way as the support lug 32 of the structural component 10, engages with the support lug 33 of the covering 24 in order to prevent undesirable sliding in direction z, as described previously.

On its opposite side, facing the engine compartment M, the frame portion 17 in the assembled state makes contact, by its support surface 22, with the contact surface 23 of the body part, thus providing a very secure fixing in direction x. The covering 24 also has, in a lateral edge region thereof, another through-hole 28 which is aligned coaxially with the through-hole 20a formed in the projecting bar 20 of the frame portion 17. In this way the covering 24 and the frame portion 17 may jointly be attached to the body part by the screw connection 27. It is expedient if the corresponding connecting or screwing point for the attachment of the screw connection 27 to the vehicle body 29 is located as far outwards as possible so that a reliable and hence high quality mounting on the vehicle body is ensured even at the outer regions of the bumper arrangement.

For fixing to its upper edge the covering 24 engages round the upper edge of the end face 35 of the frame portion 17 by means of a collar 37. A collar 37 of this kind ensures secure mounting of the covering 24 above the end face 35 of the frame portion 17, e.g. by adhesive bonding, clipping, screwing, or the like.

The box-shaped extension 21 imparts the frame portion 17 the properties of a so-called hard spring, whereby the frame portion 17 has the same spring characteristic in relation to bending stress in direction x as the adjacent structural component 10. As a result the bumper arrangement in which the structural component 10 or the frame portion 17 is mounted has a constant deformation characteristic over the entire width of the vehicle in direction x, as the frame portion 17 and structural component 10 have essentially the same spring characteristic. Furthermore, the spring characteristics of the structural component 10 and frame portion 17 correspond to the spring characteristic of an adjacent part of the bumper arrangement above them, as a result of which the so-called bending angle produced during the rolling motion of a pedestrian's leg over the bumper in the event of frontal impact is minimised and so-called softer rolling occurs.

Figure 5:
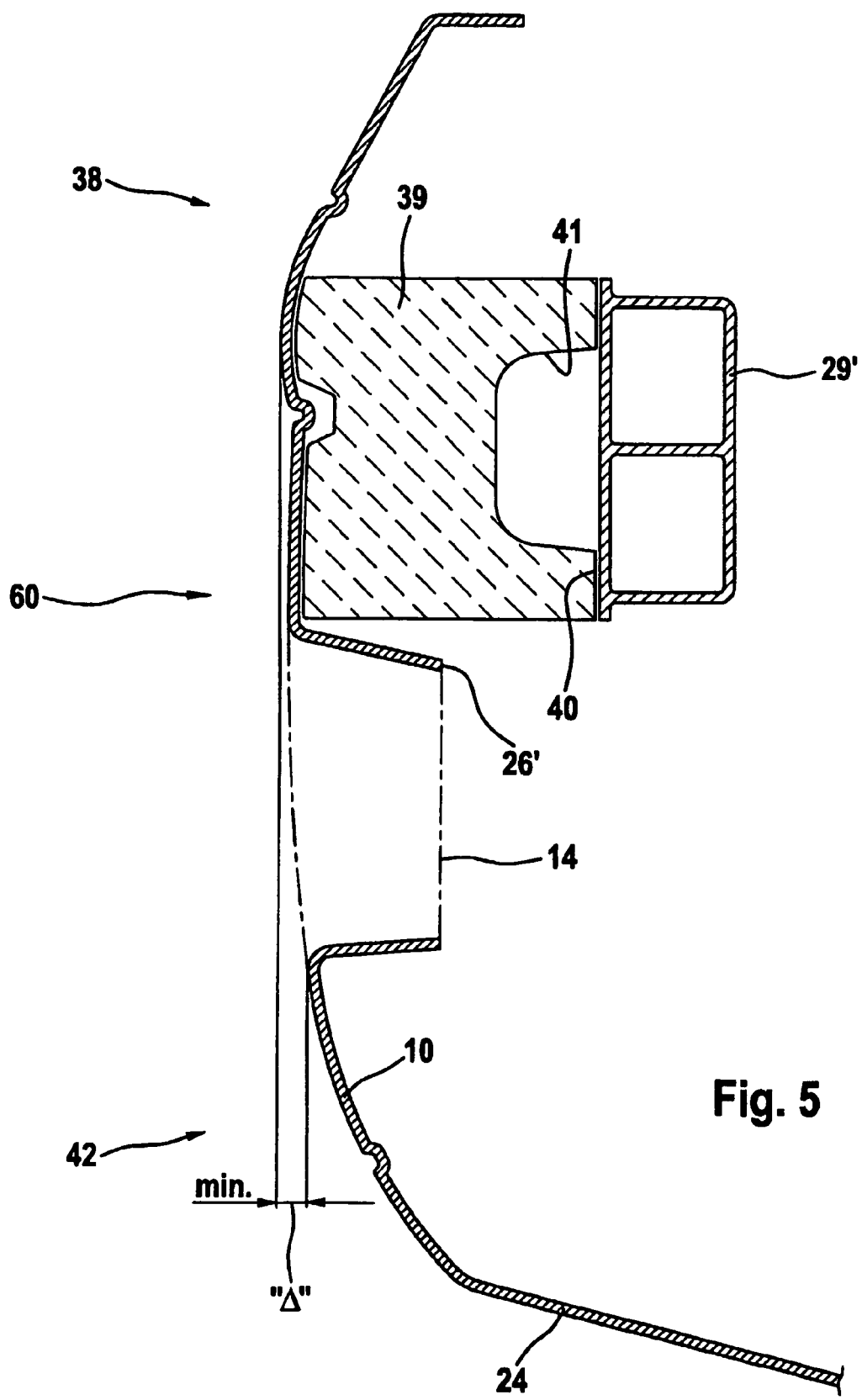
FIG. 5 is a cross-sectional view of the structural component according to the invention in the assembled state with a bumper arrangement in a lateral cross-sectional view.

FIG. 5 shows a bumper arrangement 60 with a structural component 10 mounted thereon, in a highly simplified lateral cross-sectional view. An upper region 38 of the bumper arrangement 60 is secured via a so-called impact absorber 39 to another part 29' of the vehicle body, which is in the form of a transverse bar. On an interior side 40 facing the vehicle body part 29' the impact absorber 39 has a concave cavity 41 which provides so-called softer rolling of the pedestrian's leg area as a result of corresponding deformation of the impact absorber 39.

As explained hereinbefore the structural component 10 is mounted in a lower region 42 of the bumper arrangement 60. The structural component 10 and, in connection therewith, the respective frame portions 17 are suitably constructed so that there is only a minimum overhang to the upper region 38 of the bumper arrangement in direction x. This overhang is designated with "Δ" in FIG. 5. This ensures that in the event of a frontal impact the pedestrian's leg area is struck flat on and only a small so-called bending angle is produced, in the desired manner. In other words, in the event of frontal impact, a pedestrian's lower leg is kept substantially parallel. In the highly schematic view in FIG. 6 this is shown in a lateral cross-section view. The Figure shows a pedestrian's leg 50, illustrated in dashed lines. Because of the minimal overhang Δ, which is preferably zero, the pedestrian's leg 50 is contacted virtually simultaneously both in the knee area 51 and in the shin area 52 by the front edge of the bumper arrangement, so that the bending angle α through which the thigh 53 pivots about the knee joint 51 is only very small.

By means of the structural component according to the invention, which is to be mounted in a lower region of a vehicle bumper arrangement, it is possible to comply fully with the relevant regulations for pedestrian safety in accordance with the current EURO NCAP standard, thereby significantly reducing the risk of injury both to adults and to smaller people such as children or senior citizens.

What is claimed is:

1. An assembly for a motor vehicle having a bumper arrangement and a body part, said assembly comprising:
   a structural component extending longitudinally between opposing lateral edges, said structural component including an upper edge;
   an air inlet grille fixedly secured to said upper edge of said structural component and adapted to be secured to the bumper arrangement; and
   a frame portion fixedly secured to each of said opposing lateral edges to provide lateral reinforcement to said structural component, said frame portion including a protruding bar having a through-hole extending therethrough to facilitate attachment to the body part and at least one box-shaped extension having a contact surface on a back side to abut a contact surface on the body part.

2. An assembly as set forth in claim 1 wherein said frame portion includes a support surface on a back side of said at least one box-shaped extension to abut on a contact surface of the body part.

3. An assembly as set forth in claim 2 wherein said frame portion includes a plurality of recesses formed along a top side for facilitating attachment to the bumper arrangement.

4. An assembly as set forth in claim 3 wherein said frame portion includes a central recess.

5. An assembly as set forth in claim 1 wherein said structural component includes a plurality of reinforcing elements extending laterally therealong.

6. An assembly as set forth in claim 5 wherein said structural component includes a plurality of air inlets forming an air passage through said structural component.

7. An assembly as set forth in claim 1 wherein said air inlet grille includes a top edge having a plurality of recesses for facilitating connection of said air inlet grille to the bumper arrangement.

8. An assembly as set forth in claim 1 including an outer covering fixedly secured to said structural component to cover an outer surface of said structural component.

9. An assembly as set forth in claim 8 wherein said outer covering includes a snap-in connection for securing said outer covering to said air inlet grille.

10. An assembly as set forth in claim 8 wherein said outer covering includes a plurality of through-holes for receiving a screw connection to secure said outer covering to the body part.

11. An assembly as set forth in claim 8 wherein said outer covering includes a plurality of expanding rivets for securing said outer covering to said structural component.

12. An assembly as set forth in claim 8 wherein said outer covering includes a clip connection for securing said outer covering to said structural component.

13. An assembly as set forth in claim 8 wherein each of said outer covering and said structural component includes a support lug, said support lug of said outer covering engaging said support lug of said structural component to prevent relative movement between said outer covering and said structural component.

14. An assembly as set forth in claim 8 wherein each of said outer covering and said frame portion includes a support lug, said support lug of said outer covering engaging said support lug of said frame portion to prevent relative movement between said outer covering and said frame portion.

15. An assembly as set forth in claim 8 wherein said outer covering includes a collar extending along an upper edge of an end face of the frame portion to ensure secure mounting of said outer covering to said frame portion.

16. An assembly as set forth in claim 1 including an impact absorber having a cavity, said impact absorber securing a portion of the bumper arrangement to the body part.

17. An assembly as set forth in claim 1 including an outer covering fixedly secured to said structural component to cover an outer surface thereof, said outer covering including a through-hole aligned coaxially with said through-hole in said protruding bar to allow said outer covering and said frame portion to be jointly attached to the body part by a screw connection.

* * * * *